Dec. 26, 1950 R. J. AUST 2,535,479
MAGNETIC PICKUP
Filed May 20, 1947
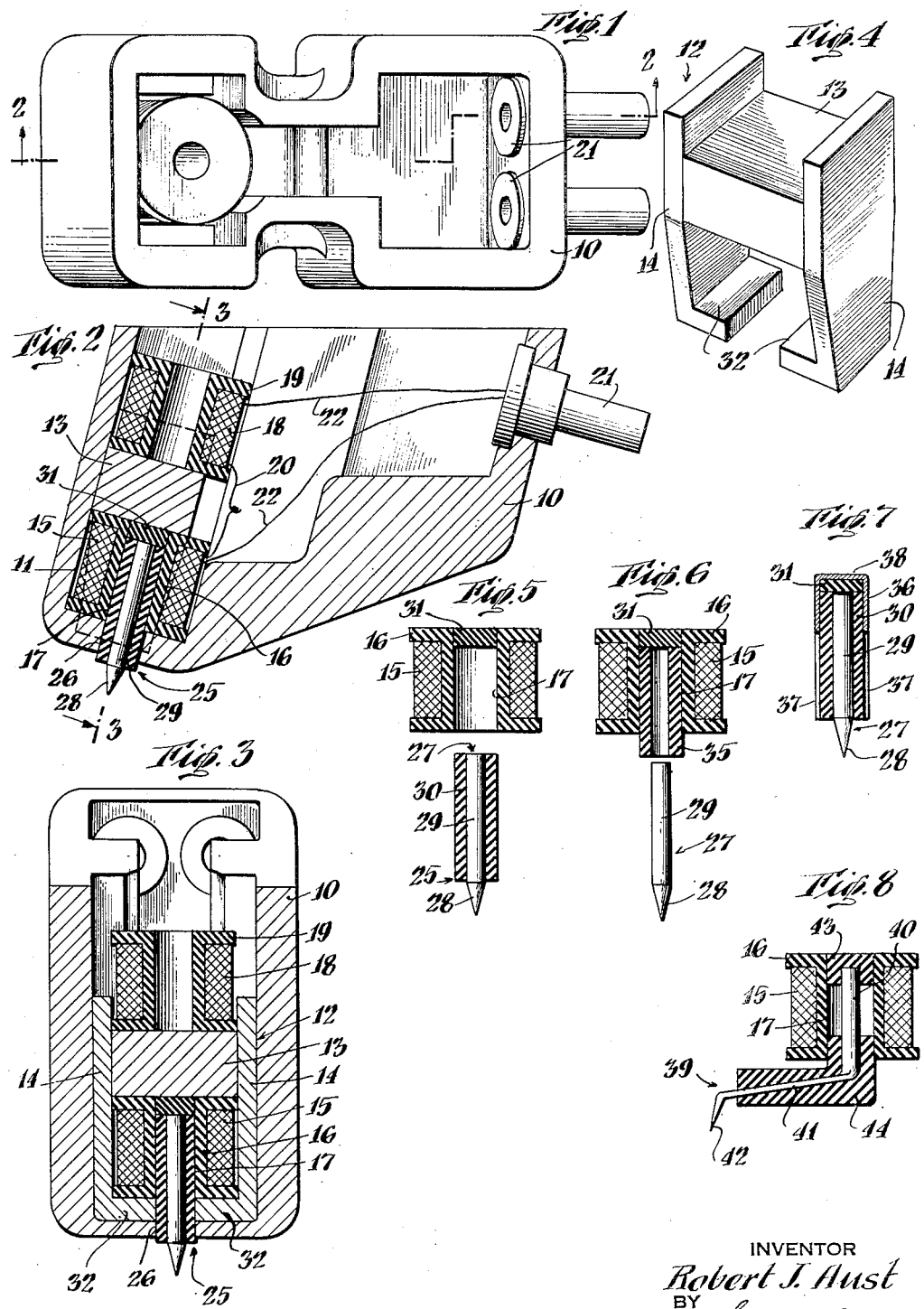
INVENTOR
Robert J. Aust
BY
Nicholas Laurop
ATTORNEY Patented Dec. 26, 1950

2,535,479

UNITED STATES PATENT OFFICE 2,535,479

MAGNETIC PICKUP

Robert J. Aust, Indianapolis, Ind., assignor to P. R. Mallory & Co., Inc., Indianapolis, Ind., a corporation of Delaware Application May 20, 1947, Serial No. 749,271

3 Claims. (Cl. 179—100.41)

This invention relates to electric pickups and to a novel stylus assembly therefor.

In electric pickups, vibrations set up by the contact of a stylus tip with the sound track of a phonograph record are utilized to change the strength of a magnetic field and thereby induce a current in a pickup coil which corresponds to the mechanical undulations of the sound track. In early pickups of this type, a metal armature was provided in which the needle was inserted and held in position by a set screw. In such pickups, the vibratory system consisted of the stylus, the armature, the chuck, and the set screw. As the art developed, it was found advantageous to reduce the mass of the vibratory system as much as possible thereby reducing the pressure upon the record and allowing more accurate reproduction of the sound track. Many structures were proposed whereby the set screw was eliminated and the needle held in the armature either by magnetism or by a mechanical clamping device not utilizing a set screw. In these pickups, the vibrating system comprised the stylus and the armature which was moved thereby and extended into the field produced by the pickup magnet. Although, in some cases, improved results were obtained with this type of pickup, difficulties were encountered in providing proper damping and in securing fidelity at high frequencies. In addition, the relatively heavy armature oftentimes exerted excessive pressure upon the record causing rapid wear of the needle and sound track. In these pickups, it was immaterial whether or not the stylus was formed of paramagnetic material inasmuch as the armature controlled the variation of the magnetic field and induced the current in the pickup coil.

In accordance with the present invention, the armature is altogether eliminated and the variations in the magnetic field are effected by the movement of a paramagnetic portion of the stylus itself, thereby reducing the vibratory system to a single part which may have a total weight of as little as 14 to 20 milligrams. Effective damping is obtained by mounting the stylus in a support of resilient material which constitutes the sole mounting therefor. To this end, the shank of the stylus may be inserted in a sleeve of resilient sponge material thereby forming an assembly which may be conveniently inserted into the field established by the pickup magnet. In such fashion, the weight of the vibrating system is reduced to an absolute minimum with resultant sharp decrease in record wear and improved fidelity of reproduction. Also, the entire stylus or needles assembly may be conveniently removed and replaced in the event the stylus tip becomes damaged or worn.

It is an object of the invention to improve the construction and operation of pickups and provide an improved stylus assembly therefor.

It is another object of the invention to provide an electromagnetic pickup in which the weight of the vibrating system is reduced to an absolute minimum.

It is a further object of the invention to provide a pickup which faithfully reproduces the highest frequencies used in high fidelity recording studios.

It is a still further object of the invention to provide a pickup having the above characteristics in which the user may readily replace the stylus or needle.

The invention also contemplates a pickup which is of simple construction, reliable in operation, and which can be assembled or disassembled with a minimum of effort.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a plan view of the novel pickup;

Figure 2 is a sectional view taken along the line 2—2 of Figure 1;

Figure 3 is a sectional view taken along the line 3—3 of Figure 2;

Figure 4 is a perspective view of the magnet and pole pieces associated therewith; and Figures 5 to 8 are sectional views illustrating various modifications of my novel stylus assembly.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail, the pickup comprises a casing 10 of Bakelite or other suitable material which has a cavity portion 11 for receiving the pickup assembly. This assembly comprises magnetic means or structure 12 which, in the example shown, includes a permanent magnet 13 brazed or otherwise suitably secured to a pair of spaced, complementary pole pieces 14.

Mounted between the pole pieces 14 is a pickup coil 15 which is wound on a bobbin or spool 16 having an axial passage 17 therein. In the example shown, a second coil 18, which is wound on a bobbin 19, is mounted in spaced, axially aligned relation to the coil 15 and adjacent terminals of these coils are connected in series by a conductor 20, the other terminals being connected, respectively, to terminal plugs 21 by leads 22. It will be apparent that the pickup may be readily connected to a suitable tone arm by the plugs 21 which may, in turn, be connected to a suitable amplifier and reproducer. The function of the coil 18 is to reduce hum pickup, as will be explained in greater detail hereafter, and although its use is ordinarily advantageous, it may, in some cases, be dispensed with.

In accordance with the invention, a novel stylus assembly 25 is mounted in the passage 17 and extends through a suitable opening 26 in the casing 10. According to the preferred embodiment of the invention shown in Figure 5, the assembly comprises a stylus 27 having a tip 28 of a suitable hard material and a shank 29 of paramagnetic material, such as iron. The stylus is embedded in and permanently affixed to a sleeve 30 of resilient material, such as sponge rubber. The sleeve is preferably of greater diameter than the passage 17 so as to be somewhat compressed when inserted therein, as illustrated in Figure 2. This compression of the sleeve holds the assembly firmly within the passage and prevents it from falling out, for example, when a record is being changed. A piece of semirigid insulating material 31 may be positioned at the upper end of the passage to prevent mechanical contact of the shank 29 with the magnet 13.

It will be apparent that the coil 15 and the paramagnetic stylus portion 29 are both disposed within the magnetic field established by the permanent magnet 13 and that the shank of the stylus is disposed between the inwardly extending bottom portions 32 of the pole pieces. Accordingly, when the stylus is vibrated, as by the groove of a phonograph disc, the paramagnetic shank portion 29 changes the reluctance of the magnetic path through the coil and induces a voltage in the coil 15 corresponding to the undulations of the record groove, this voltage being amplified in any suitable manner for operation of a reproducing device.

The vibrating system of the present pickup consists only of the stylus and, by the use of the invention, a substantial reduction in the mass of the vibrating system is effected, particularly in comparison with pickups wherein a separate armature or even the pickup coil is included in the vibratory system. In addition, the stylus, being supported solely by the resilient sleeve 30, responds faithfully to the track of the phonograph record. As a result, good frequency response and high fidelity of reproduction are obtained through the entire range, even where extremely high frequencies are to be reproduced. Further, the assembly consisting of the stylus and sleeve 30 may be easily inserted into the pickup or removed therefrom for repair or replacement. The preferred form of stylus assembly shown in Figure 5 is very advantageous in that the stylus and resilient sleeve may be manufactured as a unit for replacement purposes. Where a stylus of long life is finally replaced, a fresh sleeve may be supplied as an integral part of the replacement assembly thereby assuring that the resilience of the sleeve will always be at a maximum, with resultant consistent high quality reproduction.

The function of the coil 18 is to substantially neutralize unwanted currents induced in the pickup coil 15, for example, by the power line or the phonograph motor. It will be noted that the coil 18 is substantially outside the magnetic field produced by the magnet and pole pieces and, hence, no voltage is induced therein by vibration of the stylus. However, when an unwanted voltage is induced in the pickup coil 15, as by a power line disturbance, it is canceled by an equal and opposite voltage induced in the coil 18. Accordingly, this coil cancels out hum or noises produced by power line disturbances but does not affect voltages induced in the pickup coil by vibration of the stylus.

In Figures 6 to 8, modified forms of stylus assemblies are shown in which parts similar to those already described are indicated by like reference numerals. Referring to Figure 6, an assembly is shown in which a resilient sleeve member 35, preferably of sponge rubber, is permanently secured within the interior passage 17 of the coil support 16. It will be seen that the stylus 27 may simply be inserted into or removed from the sleeve when replacement thereof is desired. In its inserted position, the stylus is embedded in and supported solely by the resilient material 35, the inner diameter of the sleeve being slightly less than that of the stylus to prevent the latter from dropping out of the pickup when a record is changed. It will be apparent that this structure may be employed with the conventional type of pickup. However, it is preferred to utilize the modification of Figure 5 as the sponge material tends to become less resilient after prolonged use and, accordingly, it is desirable to provide a fresh rubber sleeve with each stylus, as in the embodiment of Figure 5.

In the form of the invention disclosed by Figure 7, the stylus assembly of Figure 5, consisting of the resilient sleeve 30 and stylus 27, is compressed and permanently mounted within a nonmagnetic metal sleeve 36 having diametrically opposed, longitudinal split portions 37 at one end thereof, the insulating member 31 being interposed between the end portions 38 of the metal sleeve and the inner end of the stylus. This assembly may be manufactured as a complete unit and, when inserted into the passage 17, Figure 2, the split portions of the sleeve are somewhat compressed with the result that the assembly is positively maintained in position within the pickup.

Referring now to the modification of Figure 8, a stylus assembly is shown which comprises a stylus 39 having an enlarged shank 40, an angularly bent intermediate portion 41, and a tip 42 which may be inclined, if desired, with respect to the shank 40. Permanently secured to the stylus are a first resilient member 43 positioned at the free end of the enlarged shank 40 and a second resilient member or sleeve 44 which extends from the other end of the shank and substantially completely covers the portion 41 of the stylus. Both resilient members are preferably formed of sponge rubber and are engageable with the respective ends of the passage 17, the resilient material being compressed when the assembly is inserted into the passage to securely hold it in position therein. At least the enlarged shank 40 of the stylus is formed of paramagnetic material so as to cut the lines of force established by the magnetic means 12, in response to the undulations of a record groove, thereby inducing a current in the coil 15. This form of the invention is especially suitable for use where it is desired that the stylus tip shall be inclined with respect to the shank thereof.

It will be noted that the advantages of the invention in reducing the vibrating mass of the pickup to the absolute minimum are obtained with all the modifications described. Further, in each case, the stylus may be said to be "full floating" on the resilient supports provided therefor with the result that high fidelity of reproduction is assured. It may be also pointed out that a readily replaceable stylus assembly is provided, preferably including both the stylus and the resilient support therefor, which may be manufactured at a low cost. Thus, a number of stylus assemblies may be utilized without replacing the entire pickup. This is in contrast with present practice in high quality pickups which normally involves replacement of the entire pickup when the stylus is worn out. It should also be noted that, due to the extremely low mass of the vibratory system and its inherent stiffness, there is no resonance point within the audible range of 50 to 10,000 cycles, thereby providing greatly improved high frequency reproduction.

It will be apparent that the principles of this invention are applicable not only to a phonograph pickup, wherein the mechanical variations of the record groove are transformed to electrical energy, but also to vibration pickups wherein mechanical motion is transformed into corresponding electrical energy, and the term "pickup" in the appended claims is intended to cover both types of devices. Further, the term resilient sleeve or member in the appended claims is intended to include resilient supports for the stylus of various sizes and configurations, such resilient supports constituting the sole mounting of the stylus.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. In an electric pickup, a pair of parallel, spaced, generally L-shaped pole pieces having their bases arranged to define an air gap, a permanent magnet engaging the parallel portions of said pole pieces, a generally cylindrical coil form mounted within the magnetic structure defined by said magnet and said pole pieces, said coil form having an axial passage extending therethrough, a pickup coil wound on said form, a spacer of insulating material disposed in said passage in engagement with said magnet, and a stylus assembly mounted in said passage with one end thereof engaging said spacer and the other end thereof extending through said air gap, said assembly including a sleeve of resilient material and a stylus having a paramegnetic portion embedded in said resilient sleeve.

2. In an electric pickup, a paramagnetic structure defining a pair of spaced pole pieces, a magnet interposed between said pole pieces for establishing a magnetic field in said structure, a pickup coil disposed within said field between said pole pieces and on one side of said magnet, a stylus assembly mounted in said field adjacent the pickup coil, and a humbucking coil disposed outside said field on the opposite side of said magnet, said assembly comprising a stylus having a paramagnetic shank portion and a sleeve of sponge material completely surrounding said shank portion and supported adjacent said pickup coil in substantially perpendicular relationship with said magnet.

3. In an electric pickup, a paramagnetic structure defining a pair of spaced L-shaped pole pieces, a magnet interposed between said pole pieces for establishing a magnetic field in said structure, a pickup coil disposed within said field between said pole pieces and on one side of said magnet, a stylus assembly mounted in said field adjacent the pickup coil, a spacer of insulating material interposed between said assembly and said magnet, and a humbucking coil disposed outside said field on the opposite side of said magnet, said assembly comprising a stylus having a paramagnetic shank portion and a sleeve of resilient material completely surrounding said shank portion and supported adjacent said pickup coil.

ROBERT J. AUST.

REFERENCES CITED

The following references are of record in the file of this patent:

UNITED STATES PATENTS

| Number | Name | Date |
|---|---|---|
| 1,645,139 | Harrison | Oct. 11, 1927 |
| 1,830,401 | Miessner | Nov. 3, 1931 |
| 1,830,801 | McClatchie | Nov. 10, 1931 |
| 1,834,359 | Vansickle | Dec. 1, 1931 |
| 1,835,073 | McClatchie | Dec. 8, 1931 |
| 2,105,167 | Sinnett | Jan. 11, 1938 |
| 2,241,105 | Woodruff | May 6, 1941 |
| 2,326,424 | Andres | Aug. 10, 1943 |
| 2,416,082 | Balmer | Feb. 18, 1947 |
| 2,429,137 | Root | Oct. 14, 1947 |

FOREIGN PATENTS

| Number | Country | Date |
|---|---|---|
| 276,466 | Great Britain | Sept. 1, 1927 |
| 333,895 | Great Britain | Aug. 21, 1930 |
| 337,811 | Great Britain | Nov. 7, 1930 |
| 445,423 | Great Britain | Apr. 3, 1936 |
| 333,922 | Italy | Jan. 16, 1936 |
| 377,858 | Italy | Jan. 11, 1940 |
| 725,264 | France | May 10, 1932 |